US00RE35679E

United States Patent [19]

Tanaka

[11] E Patent Number: Re. 35,679

[45] Reissued Date of Patent: Dec. 2, 1997

[54] ZOOM LENS BARREL FOR WATERPROOF AND/OR WATER-RESISTANT CAMERA

[75] Inventor: Hitoshi Tanaka, Tokyo, Japan

[73] Assignee: Asahi Kogaku Kogyo Kabushiki Kaisha, Tokyo, Japan

[21] Appl. No.: 529,266

[22] Filed: Sep. 6, 1995

Related U.S. Patent Documents

Reissue of:

[64] Patent No.: 5,243,467
Issued: Sep. 7, 1993
Appl. No.: 906,436
Filed: Jun. 30, 1992

[30] Foreign Application Priority Data

Jul. 2, 1991 [JP] Japan ..... 3-256897

[51] Int. Cl.[6] ..... G02B 15/14

[52] U.S. Cl. ..... 359/694; 359/811; 359/819; 359/826; 396/29

[58] Field of Search ..... 359/694, 699, 359/811, 819, 826, 823, 29, 87, 137, 462

[56] References Cited

U.S. PATENT DOCUMENTS

| | | | |
|---|---|---|---|
| 4,090,780 | 5/1978 | Davis | 359/826 |
| 4,099,847 | 7/1978 | Ito | 359/705 |
| 4,315,670 | 2/1982 | Shigoku | 359/701 |
| 4,397,528 | 8/1983 | Kamata | 359/702 |
| 4,458,990 | 7/1984 | Kawai | 359/700 |
| 4,577,934 | 3/1986 | Aoyagi et al. | 359/706 |
| 4,636,042 | 1/1987 | Komine et al. | 359/700 |
| 4,690,514 | 9/1987 | Kamita et al. | 359/700 |
| 4,974,949 | 12/1990 | Tanaka | 359/704 |
| 5,066,965 | 11/1991 | Tanaka et al. | 396/29 |
| 5,079,646 | 1/1992 | Schwartz | 359/819 |
| 5,212,509 | 5/1993 | Kosako et al. | 396/29 |
| 5,225,939 | 7/1993 | Iizuka | 359/811 |
| 5,264,966 | 11/1993 | Okada et al. | 359/694 |
| 5,305,145 | 4/1994 | Tanaka | 359/513 |
| 5,335,028 | 8/1994 | Kosako | 396/29 |
| 5,339,193 | 8/1994 | Korpert et al. | 359/819 |
| 5,381,272 | 1/1995 | Kato et al. | 359/823 |

FOREIGN PATENT DOCUMENTS

| | | |
|---|---|---|
| 4024732 | 4/1993 | Germany . |
| 60-130707 | 7/1985 | Japan . |
| 63-242099 | 9/1988 | Japan . |
| 1-251019 | 10/1989 | Japan . |
| 1395588 | 5/1975 | United Kingdom . |
| 2235989 | 3/1991 | United Kingdom . |
| 2240633 | 8/1991 | United Kingdom . |

*Primary Examiner*—Loha Ben
*Attorney, Agent, or Firm*—Greenblum & Bernstein, P.L.C.

[57] ABSTRACT

A zoom lens barrel having a movable lens barrel which is movable in an optical axis direction, and an opening in which the movable lens barrel is movable in the optical axis direction. The zoom lens barrel further includes a moving frame to which the movable lens barrel is secured to move in the optical axis direction together with the movable lens barrel, and an intermediary member which is positioned between the movable lens barrel and the moving frame. The movable lens barrel is secured to the moving frame through the intermediary member.

45 Claims, 4 Drawing Sheets

ZOOM LENS BARREL FOR WATERPROOF AND/OR WATER-RESISTANT CAMERA

Matter enclosed in heavy brackets [ ] appears in the original patent but forms no part of this reissue specification; matter printed in italics indicates the additions made by reissue.

BACKGROUND OF THE INVENTION

Field of the Invention

The present invention relates to a lens barrel for use in waterproof and/or water-resistant cameras, and more precisely, it pertains to a zoom lens barrel having a direction of the camera, for use in waterproof and/or water-resistant cameras.

Description of Related Art

A waterproof camera is known which does not allow water to enter the camera and can take pictures in shallow water. There is also known a water-resistant camera which resists against the penetration of drops of water or rain into the camera.

In order to develop a waterproof and/or water-resistant zoom camera having a movable barrel which is moved in the optical axis direction of the camera, it is imperative to realize a watertight connection between the movable barrel and the opening which is formed at the front of a stationary barrel. The stationary barrel is secured to the camera body or formed in a front wall of the camera body in a manner which permits the movable barrel to project from or retract into the stationary barrel. To realize the watertight connection, one solution is to position a seal member, such as an O-ring, between the movable lens barrel and the stationary barrel. In this case, the movable barrel must be very smooth (ideally, the outer periphery of the movable barrel should not be warped or distorted), so that the O-ring will maintain proper contact with the outer periphery of the movable barrel.

Formerly, in the case of a zoom lens barrel having a movable barrel, which is connected to a moving frame so as to be movable along the optical axis by means of a drive cam device, the moving frame and the movable barrel were connected to each other by screws, for example. When the screws were fastened to connect the moving frame with the movable barrel, the movable barrel tended to be distorted in the radial direction due to a variation in radial size between the movable barrel and the moving frame at the point of connection. This problem matters little for a non-waterproof and/or non-water-resistant zoom camera. Whereas, for a waterproof and/or water-resistant camera, warp or distortion in the outer periphery of the movable lens would decrease the degree of watertightness between the O-ring and the outer periphery of the movable barrel, since the outer periphery of the movable barrel is the surface on which the inner periphery of the O-ring is to be slidably contacted.

SUMMARY OF THE INVENTION

The primary object of the present invention is to provide a zoom lens barrel for a waterproof and/or water-resistant camer with which a zooming operation can be carried out while ensuring a stable watertight connection of the zoom lens barrel.

To achieve the object mentioned above, according to the present invention, there is provided a zoom lens barrel for a waterproof and/or water-resistant camera which comprises a movable barrel which is movable in an optical axis direction, and an opening in which the movable barrel is movable in the optical axis direction. There is further provided moving member to which the movable barrel is secured to move in the optical axis direction together with the movable barrel, and an intermediary member which is positioned between the movable barrel and the moving member, and wherein the movable barrel is secured to the moving member through the intermediary member.

With this arrangement, as the movable barrel is not directly secured to the moving frame, the movable barrel will not be distorted. Therefore, a stable water-tight zoom lens barrel can be realized.

The present disclosure relates to subject matter contained in Japanese Patent Application No. 03-256897 (filed on Jul. 2, 1991) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
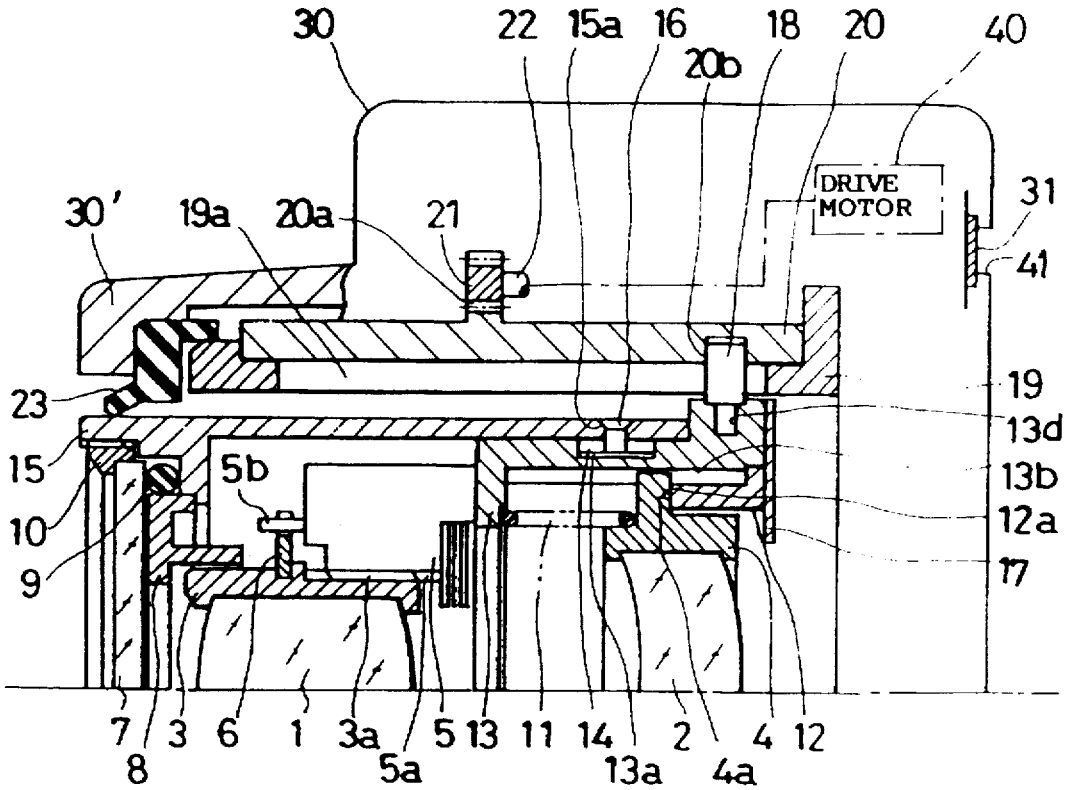
FIG. 1 is a fragmentary sectional side view of a camera to which the zoom lens barrel, according to the present invention, is applied.

FIG. 1 shows a fragmentary sectional side view of a camera to which a zoom lens barrel, according to the present invention, is provided. The zooming system adopted to this preferred embodiment is substantially the same as that of the invention shown in Japanese Patent Application No.63-242099, titled "ZOOM LENS BARREL" published on Mar. 29, 1990. The Japanese Patent Application No.63-242099 is one of the four Japanese Patent Applications on which the U.S. Pat. No. 4,974,949, titled "ZOOM LENS BARREL" is based.

Reference numeral 1 of FIG. 1 denotes a first lens group which has a relatively small amount of movement, while numeral 2 denotes a second lens group having a relatively large amount of movement. Although the illustrated lens groups 1 and 2 are each comprised of a single lens, it should be noted that each lens group may comprise a plurality of lenses.

Camera body 30, which is constructed in a watertight fashion, has a movable lens barrel 15 which is movable in the optical axis direction. In FIG. 1 the movable lens barrel 15 is in the shortest focal position as a result of the zooming operation. The movable lens barrel 15 has a protection glass 7 which is provided, in a watertight fashion, on the front end thereof to protect the lens provided therein, by means of an O-ring 9 and a fixing ring 10. Reference numeral 8 denotes a holding ring which restricts the O-ring 9 from moving inwardly. Inside the protection glass 7, the first lens group 1 is provided and is rigidly secured to a first lens group support 3. The first lens group support 3 has, on its rearward outer periphery, a helicoid 3a which is engaged with a helicoid 5a of an auto-focus unit 5 provided above the first lens group 1. On the rear wall of the camera body is provided an air-permeable and water-impermeable filter 31 in the air breathing passage 41 to permit passage of air in accordance with the movement of the movable lens barrel 15 and the resulting change in air volume of the stationary lens barrel cavity. With this structure, the first lens group 1 is driven in the optical axis direction so that the focusing operation can be effected in accordance with the operation of the auto-focus unit 5. More specifically, the auto-focus unit 5 activates an actuating pin 5b to rotate the same about the optical axis to a predetermined position in accordance with the camera-to-subject distance, thus causing an engagement piece 6, which is engaged with the pin 5b to rotate, thereby extending the first lens group 1.

Auto-focus unit 5 is rigidly secured to a first lens group supporting frame 13 (moving frame). The first lens group supporting frame 13 is connected to the movable lens barrel 15 through a ring member 14 (intermediary means). Although the feature of the present invention is in that the movable lens barrel 15 is connected to the first lens group supporting frame 13 through the ring member 14, the feature will be explained later. Three holes 13d are formed on the outer periphery of the rear of the first lens group supporting frame 13. In each of the holes 13d, there is provided a guide pin 18 which projects therefrom. The guide pins 18 are each engaged with three straight grooves 19a provided on the mounting frame 19 and each extends parallel to the optical axis. The mounting frame 19 is secured to the camera body 30. The top ends of the guide pins 18 are also engaged with three cam grooves 20b which are formed on the inner periphery of a drive cam ring 20. The drive cam ring 20 has an outer gear portion 20a provided on its outer periphery. The outer gear portion 20a is engaged with a drive pinion 21 to which rotational power from a drive motor 40 is transmitted through a power transmitting shaft 22.

With the above arrangement, driving power of the drive motor 40 is transmitted to the movable lens barrel 15 through the power transmitting shaft 22, the drive pinion 21, the drive cam ring 20, the guide pins 18, the first lens group supporting frame 13, and the ring member 14 to move the movable lens barrel 15 in the optical axis. A seal member 23 is provided on the inner periphery of a stationary lens barrel 30', projecting from the front of the camera body 30. The seal member 23 is brought into contact with the outer periphery of the movable lens barrel 15 so as to prevent materials, such as drops of water or grains of sand from entering the camera body 30.

Figure 5:
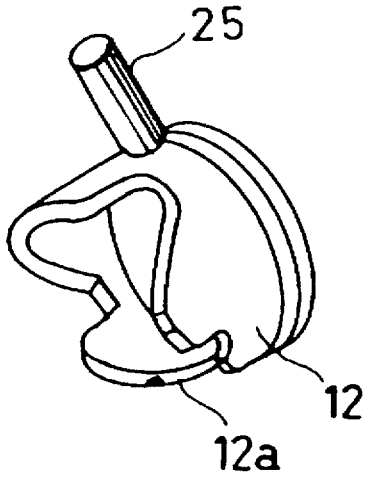
FIG. 5 is a perspective view of a drive cam cylinder.

On the other hand, the first lens group supporting frame 13, disposed in the back of the movable lens barrel 15, has a second lens group 2 therein. The second lens group 2 is firmly supported by a second lens group supporting frame 4 which is guided by a linear guide mechanism (not shown) so as to move linearly in the optical axis direction. The second lens group supporting frame 4 is biased in the rearward direction of the optical axis by a coil spring 11, which serves as biasing means. The coil spring 11 is disposed between the first and second lens group supporting frames 13 and 4 in a compressed manner. The drive cam cylinder 12, as shown in FIG. 5, is provided inside the first lens group supporting frame 13 at its rearward portion to move the second lens group 2 in the optical axis direction relative to the the first lens group supporting frame 13. A cam surface 12 a of the drive cam cylinder 12 is fitted to the guide pin 4a projecting from the second lens group supporting means 4, so the the moving range of the second lens group supporting frame 4a to the rearward direction of the optical axis by means of the coil spring 11, is limited. A stopper plate 17, as shown in FIG. 1, is rigidly secured to the rear end of the first lens group supporting frame 13 to prevent the drive cam cylinder 12 from moving in the axial direction.

Guide pin 4a, which is formed integrally with the second lens group supporting frame 4, is engaged with a straight groove 13b, which is provided on the inner periphery of the first lens group supporting frame 13 and extends parallel to the optical axis. A guide pin 25 is formed on the rear portion of the drive cam cylinder 12. The guide pin 25 extends through a circumferential groove (not shown) formed on the first lens group supporting frame 13 and is engaged with a cam groove that is formed on the inner periphery of the drive cam ring 20 (not shown), different from the cam groove 20b. With this arrangement, by the rotation of the drive cam ring 20, the zooming operation is carried out at the same time the drive cam cylinder 12 is rotated to move the second lens group 2 in the optical axis direction.

Figure 2:
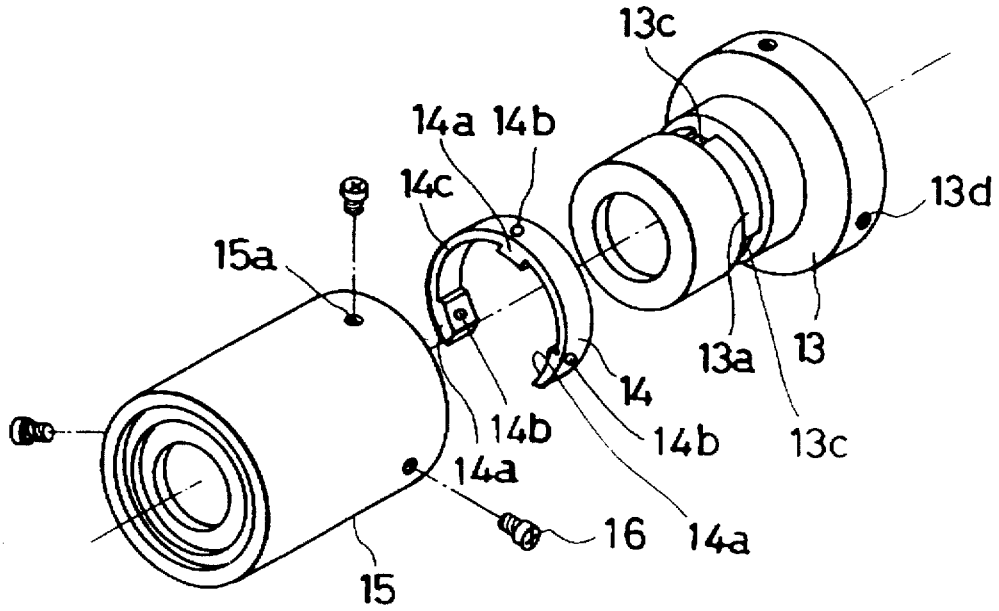
FIG. 2 is an exploded perspective view of a movable lens barrel, a ring member, and a first lens group supporting frame (moving frame)
Figure 3:
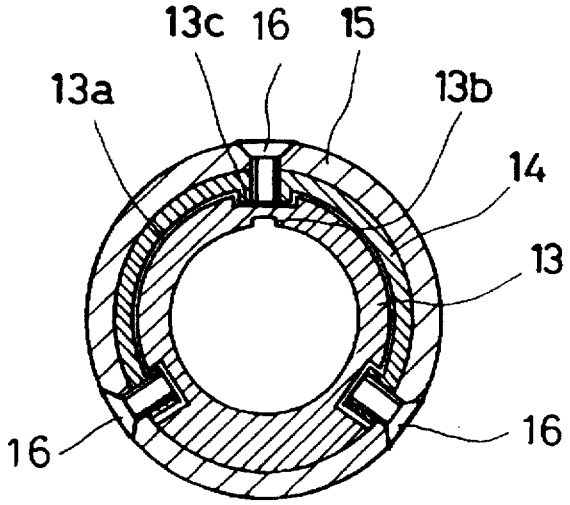
FIG. 3 is a sectional front view showing a connected portion of a movable lens barrel, ring member, and first lens supporting frame.

Details of the present invention will be explained below. FIG. 2 is an exploded perspective view of the movable lens barrel 15, the ring member 14, and the first lens group supporting frame 13, those of which are main parts of the present invention. For the purpose of simplification, some members of supporting frame 13 are not illustrated. The ring member 14, which is used for connecting the movable lens barrel 15 and the first lens group supporting frame 13 is made of synthetic resin or a die-cast material and is elastically deformable in the radial direction. Three projections 14a are formed on the inner surface of ring member 14 at equal intervals about the circumference thereof. Threaded holes 14b are provided at the center of each of the projections 14a. On the other hand, a circumferential groove 13a is formed on the outer periphery of the first lens group supporting frame 13 and three recessed portions 13c, in which the three respective projections 14a to be engaged, are formed in the circumferential groove 13a. The movable lens barrel 15 has three holes 15a to which screws 16 are to be inserted connecting the movable lens barrel 15 with the ring member 14. Accordingly, after all the members, including the ring member 14, have been installed to the first lens group supporting frame 13, the movable lens barrel 15 is to be fitted on the first lens group supporting frame 13 and then the screws 16 are to be fastened to the threaded holes 14b, provided on the ring member 14, through the holes 15a formed on the movable lens barrel 15, so as to connect the movable lens barrel 15 with the first lens group supporting frame 13. A sectional front view of the movable lens barrel 15, the ring member 14 and the first lens group supporting frame 13, all of which are connected by means of the screws 16 at the connected position are shown in FIG. 3.

Figure 4:
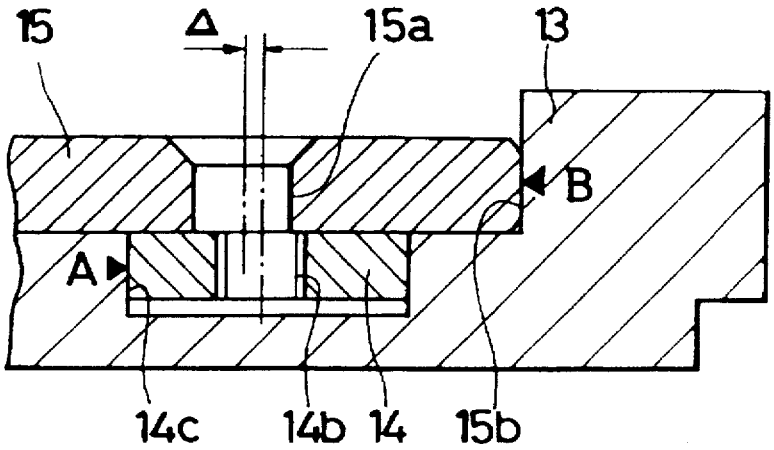
FIG. 4 is a sectional side view showing a connected portion of a movable lens barrel, ring member, and a first lens supporting frame.

In this embodiment, to connect the movable lens barrel 15 with the first lens group supporting frame 13 firmly, the manner described below is adopted. As shown in FIG. 4, the center of each hole 15a is deviated from that of the respective threaded hole 14b in the optical axis direction by a predetermined distance $\Delta$. Therefore, When the movable lens barrel 15 is firmly secured to the ring member 14 by means of the screws 16, rear end 15b of the movable lens barrel 15 and surface B of the first lens group supporting frame 13 are pressed against each other, while a front end 14c of the ring member 14 and a surface A of the first lens group supporting frame 13 are pressed against each other. In this manner, the movable lens barrel 15 and the first lens group supporting frame 13 can be firmly connected to each other. Furthermore, it is possible to eliminate the play which might occur in the optical axis direction as a result of an imperfect connection between the movable lens barrel 15 and the first lens group supporting frame 13. It should be noted that the number of the screws 16, holes 15a, threaded holes 14b, projections 14a, and the recessed portions 13c is not limited to three.

Figure 6:
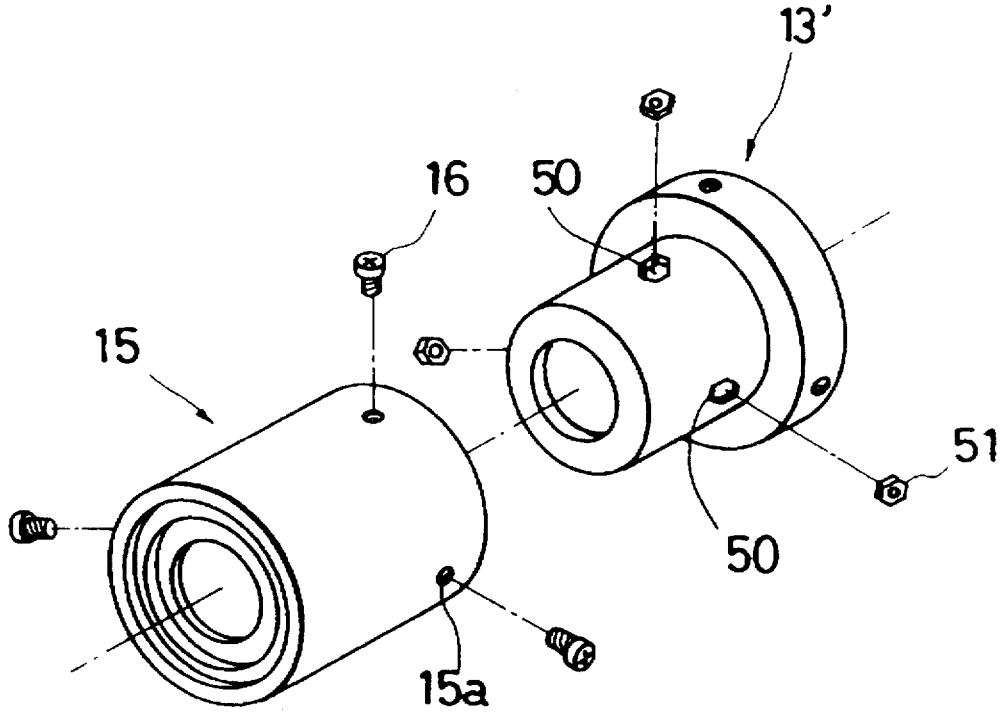
FIG. 6 is an exploded perspective view of a movable barrel, a ring means, and a supporting means.

FIG. 6 shows another embodiment of the present invention. In this embodiment, hexagonal nuts 51 are used as connecting devices instead of using the ring member 14, as shown in the first embodiment. A first lens group supporting frame 13' has three recessed portions 50, the shape of which corresponds to the hexagonal nuts 51 and which are provided at equal intervals about the circumference of the first lens group supporting frame 13'. The hexagonal nuts 51 are inserted into respective recessed portions 50. After all the necessary members are installed in the first lens group supporting fraeme 13', the movable lens barrel 15 is fitted on the first lens group supporting frame 13'. Then the screws 16 are fastened to the hexagonal nuts 51 through holes 15a to connect the movable lens barrel 15 to the first lens group supporting frame 13'. In this embodiment, to firmly connect the movable lens barrel 15 to the first lens group supporting frame 13', a method similar to that of the first embodiment is adopted. That is, the center of each hole 15a is deviated from that of respective threaded hole of the hexagonal nut 51 in the optical axis direction by a predetermined distance.

In this embodiment, hexagonal nuts are used as the intermediary means. However, it should be noted that nuts having any other shape may also be used as an intermediary.

The zoom lens barrel, according the present invention, can be applied not only to a zoom lens barrel incorporated together with a camera body but also to a zoom lens barrel which can be detachable attached to a camera body.

In the above two embodiments, the movable lens barrel 15 is moved forwards and backwards along the optical axis in accordance with the arrangement of the optical axis in accordance with the arrangement of the guide pins 18, provided in the first lens group supporting means 13 or 13', which are slidable engaged with the cam grooves 20b formed on the inner periphery of the drive cam ring 20. However, the guide pins 18 may be provided on the movable lens barrel 15 instead.

Although the invention has been described with reference to particular means, materials and embodiments, it is to be understood that the invention is not limited to the particulars disclosed and extends to all equivalents within the scope of the claims.

I claim:

1. A zoom lens barrel, comprising:

a movable barrel in an optical axis direction;

an opening in which said movable barrel is movable in the optical axis direction;

a moving member to which said movable barrel is secured to move in the optical axis direction together with said movable barrel;

an intermediary member positioned between said movable barrel and said moving member, said intermediary member being fixed with respect to said movable barrel, so that said intermediary member moves together with said movable barrel in the optical axis direction, wherein said movable barrel is secured to said moving member through said intermediary member.

2. A zoom lens barrel according to claim 1, further comprising a stationary barrel secured to a camera body, said opening being formed at the front end thereof.

3. A zoom lens barrel according to claim 2, further comprising an annular seal member, wherein an outer periphery of said annular seal member is secured to an inner periphery of said stationary barrel, and wherein an inner periphery of said annular seal member is fitted to an outer periphery of said movable barrel.

4. A zoom lens barrel according to claim 1, further comprising an annular seal member, said annular seal member being provided in said opening, and wherein an inner periphery of said annular seal member is fitted to an outer periphery of said movable barrel.

5. A zoom lens barrel according to claim 1, wherein said intermediary member is a substantially C-shaped ring member deformable in a radial direction.

6. A zoom lens barrel according to claim 5, wherein a circumferential groove is formed on an outer periphery of said moving member, and wherein said ring member is engaged with said circumferential groove.

7. A zoom lens barrel according to claim 6, wherein said ring member is secured to an inner periphery of said movable barrel by a connecting means.

8. A zoom lens barrel according to claim 7, wherein said connecting means is a plurality of screws.

9. A zoom lens barrel according to claim 8, wherein a plurality of recessed portions are formed on an inside of said circumferential groove, and wherein said ring member is provided on its inner periphery with projecting portions corresponding to and engaging with said plurality of recessed portions.

10. A zoom lens barrel according to claim 9, wherein said projecting portions are each provided with a threaded hole into which screws are inserted to secure said ring member to said movable barrel.

11. A zoom lens barrel according to claim 6, wherein a plurality of recessed portions are formed on an inside of said circumferential groove, and wherein said ring member is provided on its inner periphery with projecting portions corresponding to and engaging with said plurality of recessed portions.

12. A zoom lens barrel according to claim 11, wherein said projecting portions are each provided with a threaded hole into which screws are inserted to secure said ring member to said movable barrel.

13. A zoom lens barrel according to claim 7, wherein a plurality of recessed portions are formed on an inside of said circumferential groove, and wherein said ring member is provided on its inner periphery with projecting portions corresponding to and engaging with said plurality of recessed portions.

14. A zoom lens barrel according to claim 13, wherein said projecting portions are each provided with a threaded hole into which screws are inserted to secure said ring member to said movable barrel.

15. A zoom lens barrel according to claim 1, wherein said intermediary member is a plurality of nuts.

16. A zoom lens barrel according to claim 15, wherein receiving holes corresponding to said plurality of nuts are provided on an outer periphery of said moving member, said plurality of nuts being inserted into said receiving holes.

17. A zoom lens barrel according to claim 16, wherein said plurality of nuts are each secured to an inner periphery of said movable barrel by means of screws.

18. A zoom lens barrel, comprising:

a movable barrel movable in an optical axis direction;

a moving member to be secured to a rearward portion of said movable barrel, said moving member being movable with said movable barrel;

an intermediary member positioned between said movable barrel and said moving member, wherein said intermediary member is secured to said movable barrel be screws, and wherein said intermediary member is fitted in said moving member in a flush manner, said intermediary member being fixed to and movable together with said moving member in the optical axis direction.

19. A zoom lens barrel, comprising:

a movable barrel movable in an optical axis direction;

a ring member fitted in an inner periphery of said movable barrel and secured thereto by means of screws; and a moving member in which said ring member is fitted in a flush manner, said ring member being movable together with said moving member in the optical axis direction.

*20. A zoom lens barrel, comprising:*

*a moving member movable along an optical axis direction;*

*a barrel movable along the optical axis direction, first connecting means provided in said barrel for connecting said barrel to said moving member;*

*an intermediary member between said barrel and said moving member, and including second connecting means for connecting said barrel to said moving member; and*

*said first and second connecting means being offset with respect to each other a predetermined distance along the optical axis direction such that said intermediary member is fixed to said barrel, and said moving member is secured to said barrel by engagement of said first connecting means of said barrel and said second connecting means of said intermediary member.*

*21. The zoom lens barrel according to claim 20, wherein said first connecting means includes a plurality of screws.*

*22. The zoom lens barrel according to claim 21, wherein said intermediary member includes a substantially C-shaped ring member deformable in a radial direction, said second connecting means comprising a plurality of threaded holes in said ring member.*

*23. The zoom lens barrel according to claim 22, wherein said moving member has a circumferential groove, said ring member engageable with said circumferential groove.*

*24. The zoom lens barrel according to claim 23, further comprising:*

*said ring member having a plurality of projecting portions disposed along an inner periphery of said ring member; and*

*said circumferential groove having a plurality of recessed portions, corresponding to and engaging with, said plurality of projecting portions of said ring member.*

*25. The zoom lens barrel according to claim 24, wherein said threaded holes are provided in said projecting portions of said ring member for engaging corresponding ones of said plurality of screws to secure said barrel to said moving member.*

*26. A zoom lens barrel according to claim 25, further comprising:*

*said plurality of projecting portions corresponding to a plurality of holes in said barrel; and*

*each of said threaded boles of said plurality of projecting portions being offset by said predetermined distance from said corresponding ones of said plurality of holes in said barrel.*

*27. A zoom lens barrel according to claim 21, wherein said intermediary member comprises a plurality of nuts.*

*28. A zoom lens barrel according 27, wherein said second connecting means includes a plurality of threaded holes defined in said plurality of nuts, into which said plurality of screws are insertable to secure said barrel to said moving member.*

*29. The zoom lens barrel according to claim 28, wherein said moving member has a plurality of receiving holes for receiving said plurality of nuts, respectively.*

*30. The zoom lens barrel according to claim 20, further comprising:*

*a stationary barrel secured to a camera and having an opening; and*

*said barrel being movable through said opening.*

*31. The zoom lens barrel according to claim 30, further comprising an annular seal member provided in said opening, an inner periphery of said annular seal member contacting an outer surface of said barrel.*

*32. The zoom lens barrel according to claim 31, an outer periphery of said annular seal member being secured to an inner periphery of said stationary barrel.*

*33. A zoom lens barrel for a camera including a lens barrel movable in an optical axis direction and a frame to which said lens barrel is attached, said frame movable in the optical axis direction together with said lens barrel, said zoom lens barrel comprising:*

*an intermediary member positioned between said lens barrel and said frame; and*

*connecting means for rigidly connecting said intermediary member and said lens barrel, whereby said lens barrel is pressed against said frame in the optical axis direction by said connecting means.*

*34. The zoom lens barrel according to claim 33, further comprising a camera body including a camera opening through which said lens barrel is movable in the optical axis direction.*

*35. The zoom lens barrel according to claim 34, further comprising an annular seal member arranged in said camera opening, an inner peripheral surface of said seal member being adjacent to an outer peripheral surface of said movable lens barrel.*

*36. The zoom lens barrel according to claim 35, an outer peripheral surface of said annular seal member being secured to an inner peripheral surface of a stationary lens barrel mounted to said camera body.*

*37. The zoom lens barrel according to claim 33, said intermediary member comprising a C-shaped ring which is elastically deformable in a radial direction.*

*38. The zoom lens barrel according to claim 37, a circumferential groove provided in an outer peripheral surface of said frame, said ring engaged with said circumferential groove.*

*39. The zoom lens barrel according to claim 38, wherein said ring is secured to an inner peripheral surface of said lens barrel through said connecting means.*

*40. The zoom lens barrel according to claim 39, said connecting means comprising a plurality of screws.*

*41. The zoom lens barrel according to claim 40, a plurality of recesses formed on an inner surface of said circumferential groove, and said ring including projecting portions on an inner peripheral surface, said projecting portions corresponding to and engageable with said plurality of recesses.*

*42. The zoom lens barrel according to claim 41, said projecting portions each have a threaded hole into which screws are engageable for connecting said ring and said lens barrel.*

*43. The zoom lens barrel according to claim 33, said intermediary member comprising a plurality of nuts.*

*44. The zoom lens barrel according to claim 43, further comprising accommodating holes provided on an outer periphery of said frame, said nuts being insertable into said accommodating holes.*

*45. The zoom lens barrel according to claim 44, further comprising screws for connecting said nuts to an inner peripheral surface of said lens barrel.*

* * * * *